United States Patent [19]

Wiblin et al.

[11] Patent Number: 5,055,961
[45] Date of Patent: Oct. 8, 1991

[54] FLYBACK CURRENT DAMPENING APPARATUS

[75] Inventors: Wayne T. Wiblin, Ashtabula; Arthur Wild, Thompson, both of Ohio

[73] Assignee: Caterpillar Industrial Inc., Mentor, Ohio

[21] Appl. No.: 431,810

[22] Filed: Nov. 6, 1989

[51] Int. Cl.$^5$ .......................................... H01H 47/00
[52] U.S. Cl. ................................. 361/154; 323/270; 323/349
[58] Field of Search ................ 361/152, 154; 323/270, 323/265, 349

[56] References Cited

U.S. PATENT DOCUMENTS

| | | | |
|---|---|---|---|
| 3,480,839 | 11/1969 | Johansson | 317/142 |
| 4,167,030 | 9/1979 | Heidt | 361/154 |
| 4,453,194 | 6/1984 | Frankeny et al. | 361/154 |
| 4,502,090 | 2/1985 | Sloan | 361/153 |
| 4,516,185 | 5/1985 | Culligan et al. | 361/154 |
| 4,665,348 | 5/1987 | Stupak, Jr. | 361/154 |
| 4,679,116 | 7/1987 | Oshizawa et al. | 361/154 |
| 4,680,667 | 7/1987 | Petrie | 361/154 |
| 4,729,056 | 3/1988 | Edwards | 361/153 |
| 4,764,840 | 8/1988 | Petrie | 361/154 |

Primary Examiner—A. D. Pellinen
Assistant Examiner—Jeffrey A. Gaffin
Attorney, Agent, or Firm—Alan J. Hickman; Steven R. Janda

[57] ABSTRACT

An apparatus for dampening current in a coil has a switchable member which controls the current level in the coil and a flyback circuit that allows current in the coil to slowly dissipate when the switchable member changes from an "ON" to an "OFF" state. The flyback circuit has a high resistance when the switchable member changes from the "ON" to the "OFF" state so that the coil current is dampened as quickly as possible without creating a destructive voltage and low resistance when the switchable member is in the "ON" state to conserve energy. A signaling device creates a voltage signal as a function of current passing through the flyback circuit and a receiving device varies the resistance of the flyback circuit in response to the voltage signal. The apparatus is particularly suited for use in a motor control circuit.

15 Claims, 2 Drawing Sheets

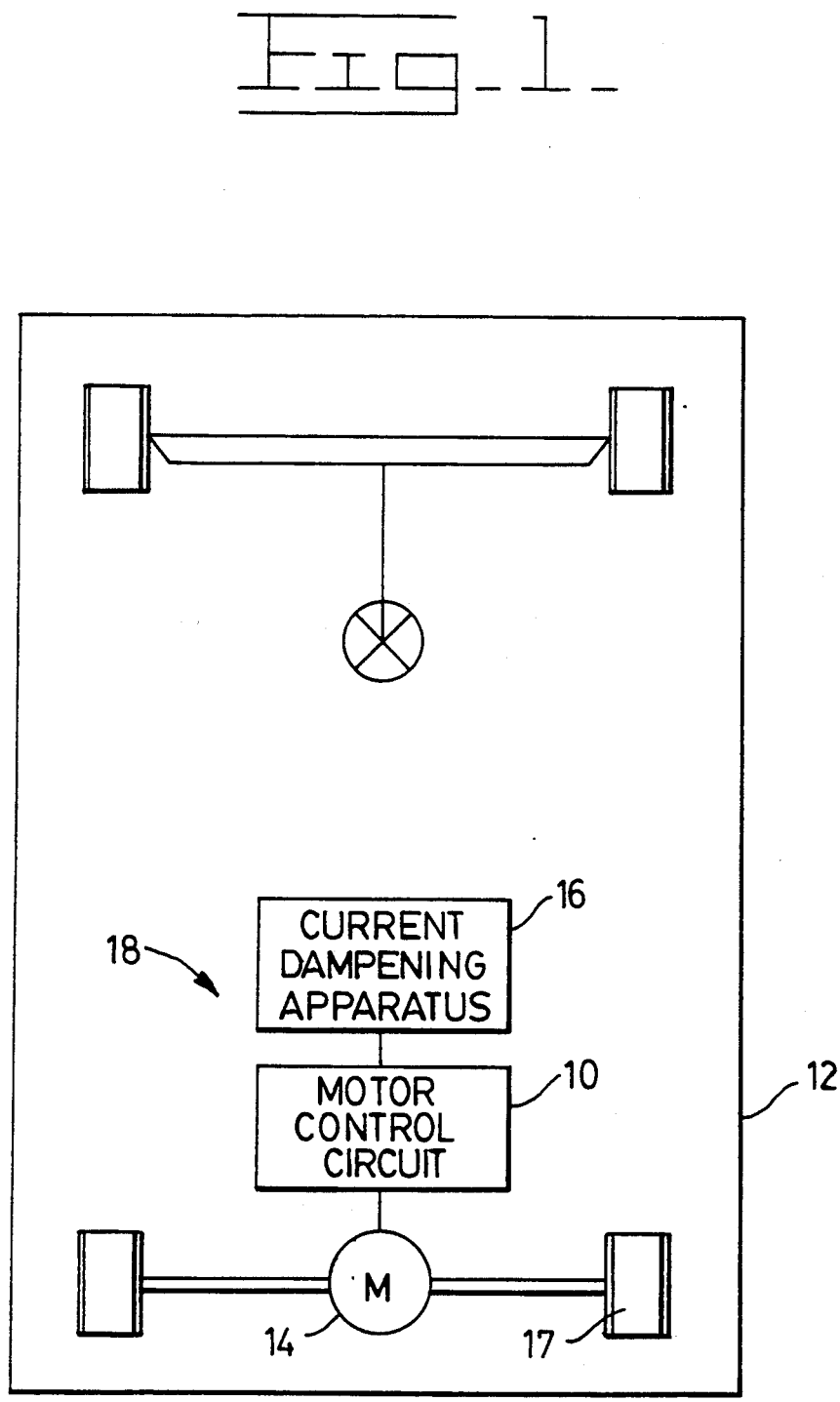

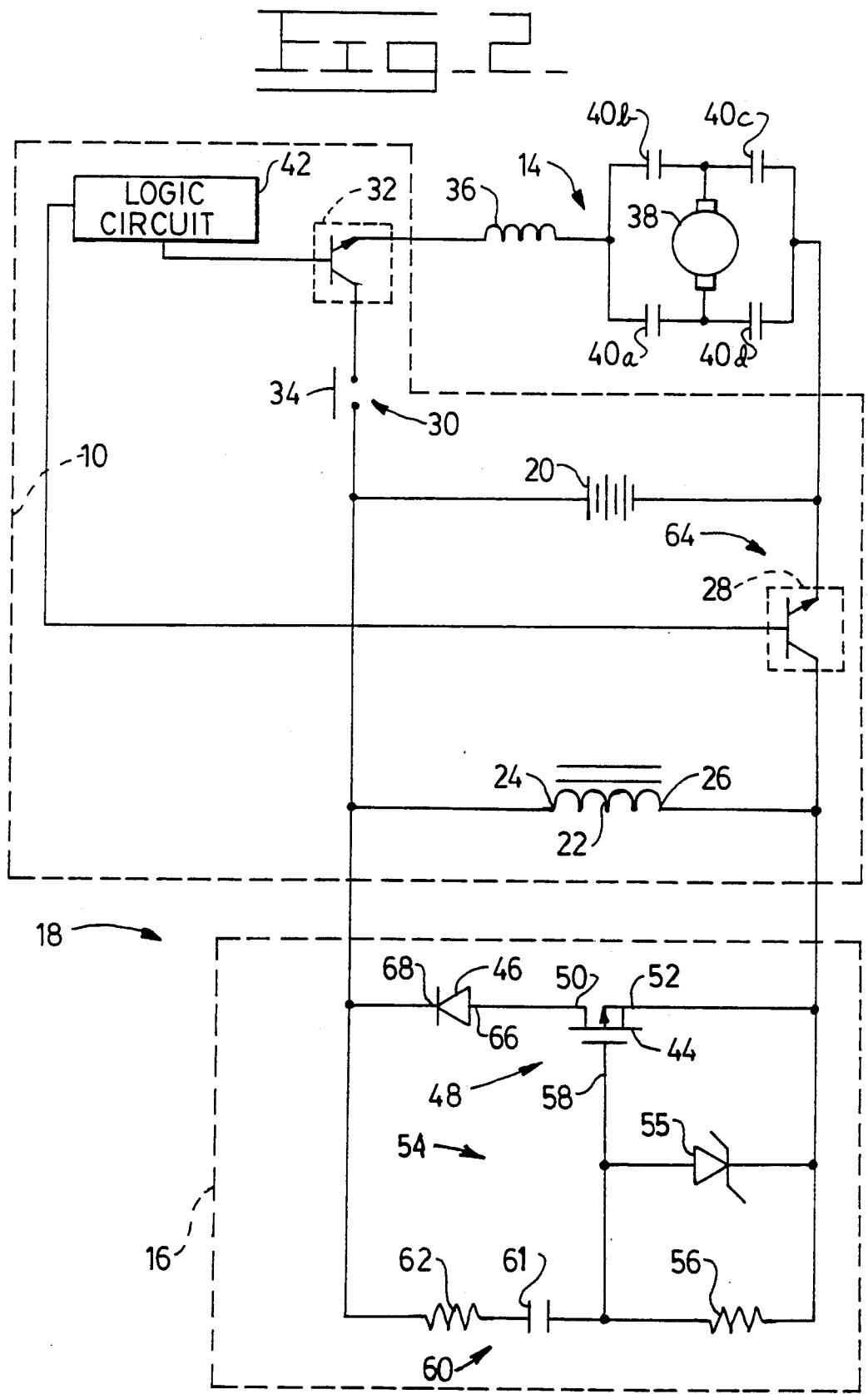

FLYBACK CURRENT DAMPENING APPARATUS

DESCRIPTION

1. Technical Field

This invention relates generally to a system current in a coil and more particularly for dampening to a system for dampening current in the coil of a contactor in the drive circuit of a work vehicle.

2. Background Art

In electrically powered work vehicles, electromagnetic contactors are located in the drive circuit to alternatively connect and disconnect the motor from the battery. Such contactors contain an inductive coil to actuate the contactor. When current is passed from a current source to the inductive coil, the coil produces a magnetic field that causes the contactor to become engaged. Another property of the inductive coil is that it will produce a destructive voltage across its terminals if the current therein abruptly changes. Therefore, a flyback circuit is connected in parallel with the coil to provide an alternate path for the current to flow through when the coil is disconnected from the current source. The flyback circuit allows the current to slowly dissipate. While the current level is dissipating, however, the magnetic field produced by the coil is not sufficient to maintain contact of the contactor tips. As a result, arcing occurs at the contactor tips due to the voltage difference between the tips. The arcing damages the surface of the contactor tips and reduces the contactor's useful life. It is therefore desirable to quickly dampen the current in a flyback circuit when the coil is disconnected from the current source. However, the current must not be dampened so quickly that a destructive voltage is created across the coil terminals.

A lesser amount of current is required to maintain the contactor in its engaged position than is required to initially bring the contacts together. To save energy, the current source is pulsed after the contactor is engaged such that the mean value of current passing from the current source is reduced to a value above the level required to maintain the contactor in its engaged position.

In previous non-pulsed systems, a resistor has been placed in the flyback circuit to more quickly dampen the coil current. If the current source is pulsed, however, current flows through the flyback circuit during each "OFF" pulse and the resistor will produce excess waste heat and reduce the magnetic force of the coil during the "OFF" pulses. Therefore, energy is wasted.

U.S. Pat. No. 4,516,185, "Time Ratio Control Circuit For Contactor Or The Like", issued May 7, 1985, to Culligan et al. teaches the use of a bypass switch to short the resistor in the flyback circuit when the contactor coil is being energized. The switch is opened when the source is disconnected from the coil. This arrangement is disadvantageous because additional components and complex circuitry are required to create a separate signal to open the bypass switch. More expensive semiconductor devices and additional warehousing space are required. Furthermore, the resistive value in this arrangement must be varied in order to function optimally with a wide array of coils. The resistive value must be chosen to dampen the current as quickly as possible and still prevent a damaging voltage spike on the coil.

The present invention is directed to overcoming one or more of the problems as set forth above.

DISCLOSURE OF THE INVENTION

In one aspect of the present invention, a coil dampening apparatus is provided. A coil is connected to a source circuit and a flyback circuit. The source circuit includes a current source and a switching element having "ON" and "OFF" states. A signalling apparatus is provided to produce a voltage signal as a function of the magnitude of current flowing through the flyback circuit. A receiving device varies the resistance of the flyback circuit as a function of the voltage signal.

In another aspect of the present invention, an electric motor system has a coil, a source circuit, a motor, and a contactor. The coil is connected to the source circuit and to a flyback circuit. The source circuit includes a pulsed current source and a switching element having "ON" and "OFF" states. The contactor includes a member being movable between engaged and disengaged positions in response to current flowing through the coil. A signalling apparatus is provided to produce a voltage signal as a function of the magnitude of current flowing through the flyback circuit. A receiving device varies the resistance of the flyback circuit as a function of the voltage signal.

In another aspect of the invention, a work vehicle has a traction motor connected to a current source. A contactor connects the traction motor to the current source. The series combination of a diode and a field effect transistor forms a flyback circuit that is connected in parallel with a coil. A switching element controls the current flowing between the current source and the coil. A zener diode is connected to and between the gate and source of the field effect transistor. A capacitor is connected to and between the transistor gate and the first terminal of the coil.

The flyback current dampening apparatus quickly dissipates current in the coil when the switching element changes from the "ON" to the "OFF" state and reduces the potential for damaging contactor arcing. The invention accomplishes this task without a separate logic signal and is operable with a wide array of coils.

BRIEF DESCRIPTION OF THE DRAWINGS

FIG. 1 a schematic plan view of a work vehicle showing a block diagram of an electric motor system embodying the invention.

FIG. 2 is a schematic representation of the embodiment of FIG. 1.

BEST MODE FOR CARRYING OUT THE INVENTION

Referring to FIG. 1, an electric motor control circuit 10 is shown in a work vehicle 12, for example an electrically driven lift truck, material handling vehicle, or the like. The control circuit 10 is connected to a motor 14 and to a current dampening apparatus 16 to form an electric motor system 18. In the preferred embodiment, the motor 14 is the traction motor of the work vehicle 12. The traction motor 14 is connected to at least one of the wheels 17. The electric motor system 18 can also be utilized in various other devices requiring a motor and motor control logic.

Referring now to FIG. 2, the electric motor control circuit 10 includes a current source 20, preferably a battery, connected to a coil 22 having first 24 and second 26 terminals through a coil switching element 28.

The current source 20 and coil switching element 28 form a source circuit 64. The current source 20 is also connected to the motor 14 via a contactor 30 and a motor switching element 32, for example a power transistor. The contactor 30 includes a conductive member 34 which is movable between open and closed positions at which the contactor 30 passes and blocks current, respectively. The contactor 30 is closed when current passes through the coil 22. It should be noted that a contactor that is open when current passes through the coil 22 would operate similarly. Contactors 30 suitable for use in such motor control circuits 10 are well known in the art and will not be discussed in any further detail. The motor 14 includes a field winding 36 and an armature 38. Direction contactors 40a,40b,40c,40d controllably determine the direction of rotation of the armature 38. The direction contactors 40a,40b,40c,40d are actuated in response to operator input (not shown). The control circuit 10 includes a logic circuit 42 for controlling the coil and motor switching elements 28,32. The logic circuit 42 responds to various input control elements, for example, accelerator and direction control devices (not shown), and produces time duration controlled pulses that are delivered to the motor switching element 32. Responsively, the electric motor 14 is operated in accordance with the mean power delivered by the motor switching element 32, assuming that the line contactor 30 is engaged. In response to the contactor 30 being open, power is interrupted from the current source 20 to the motor switching element 32, and the electrical motor 14 is disabled.

The movable member 34 of the contactor 30 is moved between the open and closed positions in response to the current flowing through the coil 22. The current level in the coil 22 is controlled by the coil switching element 28 which has "ON" and "OFF" states. The coil switching element 28 operates in response to a signal delivered from the logic circuit 42. The logic circuit 42 is of the type well known in the art for controlling electric motors 14. The initial signal delivered from the logic circuit 42 is of constant magnitude and causes the coil switching element 28 to constantly pass current between the current source 20 and the coil 22. When the coil switching element 28 is passing current, it is considered to be in the "ON" state. After a preselected duration of time, the signal from the logic circuit 42 is a pulse train. In response to receiving the pulse train, the coil switching element 28 rapidly alternates between passing and blocking current between the current source 20 and the coil 22. The current flowing between the current source 20 and the coil 22 is therefore pulsed. The current level in the coil 22 is equal to the mean value of the current passing through the coil switching element 28. The period of the pulse train is chosen to maintain the current in the coil 22 at a sufficiently high level to prevent the contactor 30 from opening. When the coil switching element 28 is pulsing, it is considered to be in the "ON" state.

A current dampening apparatus 16 is connected to the coil 22. The current dampening apparatus 16 includes a means 44 for receiving a voltage signal and responsively varying resistance of a flyback circuit 48 as a function of the received voltage signal. The means 44 preferably includes a MOSFET 44 having a drain 50 and a source 52 which are coupled in series with the diode 46 to form a flyback circuit 48. The flyback circuit 48 is connected in parallel with the coil 22.

The MOSFET 44 acts as a linearly variable resistor being controlled by the voltage between the source 52 and the gate 58. MOSFETs are particularly well suited for this application due to their linear operation for a wide range of source 52 to gate 58 voltages.

A means 60 is provided for producing a voltage signal as a function of the magnitude of the current passing through the flyback circuit. The means 60 preferably includes a capacitor 61 and a resistor 62 which are connected in series to and between a gate 58 of the MOSFET 44 and the first terminal 24 of the coil 22. The resistor 62 forms a noise filter with the capacitor 61 is not necessary for the operation of the circuit.

A means 54 for maintaining the MOSFET 44 in saturation when the coil switching element 28 is in the "ON" state, preferably includes the capacitor 61 and a zener diode 55. The capacitor 61 is connected between the gate 58 of the MOSFET 44 and the resistor 62. The resistor 62 is connected to the cathode of diode 68. The zener diode 55 is connected between the gate 58 of the MOSFET 44 and the source 52. The zener diode limits the voltage between the gate 58 and source 52 of the MOSFET 44 to 15V or less in the preferred embodiment, and provides a discharge path for capacitor 61 when the coil switching element 28 is in the "ON" state.

Industrial Applicability

With reference to the drawings and in operation, a current dampening apparatus 16 is provided to quickly dampen current in the flyback circuit 48 when the coil switching element 28 changes from the "ON" to the "OFF" state.

To close the contactor 30, the logic circuit 42 delivers a signal of constant magnitude to the coil switching element 28. The signal causes the coil switching element 28 to pass current between the current source 20 and the coil 22. In response to current passing through the coil 22, a magnetic field is created that pulls the moveable member 34 into the closed position.

After a preselected duration of time, the contactor is closed and the logic circuit 42 delivers a pulse train signal to the coil switching element 28. Once the contactor 30 is closed, less energy is required to maintain the moveable member 34 in the closed position than is required to pull the moveable member 34 to the closed position. By pulsing the coil switching element 28, the mean value of current passing between the current source 20 and the coil 22 is reduced to a level that is sufficient to maintain the moveable member 34 in the closed position. When the coil switching element 28 is pulsed, current flows through the source circuit 64 during the "ON" pulses and through the flyback circuit 48 during the "OFF" pulses.

To open the contactor 30, the coil switching element 28 changes from the "ON" state to the "OFF" state thereby preventing current from passing between the current source 20 and the coil 22. As a result, current flows in the flyback circuit 48. The coil 22 tries to maintain the level of current flowing through it by increasing the voltage between the second 26 and first 24 terminals. As the coil voltage increases, the zener diode 55 maintains a preselected voltage, preferably 15V, between the source 52 and gate 58 of the MOSFET 44 and forces the MOSFET 44 into a saturated state. The resistance between the drain 50 and source 52 is very low when the MOSFET 44 is in the saturated state. The voltage between the source 52 and gate 58 of the MOSFET 44 causes a current to flow in the resistor 56. The current in the resistor 56 charges the capacitor 61 thus producing a voltage signal. As the capacitor 61 charges, the voltage signal causes the voltage between the source 52 and gate 58 of the MOSFET 44 to decrease. When the voltage between the source 52 and gate 58 reaches a predetermined level, preferably 4V, the MOSFET 44 enters an active state. When the MOSFET 44 is in the active state, the resistance between the source 52 and drain 50 of the MOSFET 44 rises rapidly as the voltage between the source 52 and the gate 58 decreases. As the voltage between the source 52 and gate 58 drops to a predetermined level, a large resistance is created in the flyback circuit 48. The large resistance causes the coil current to dissipate rapidly and thereby causes the contactor 30 to open quickly. The coil current, however, is not dampened so quickly that a destructive voltage is created across the coil.

The resistance in the flyback circuit 48 is very low when the coil switching element 28 is pulsed because the zener diode 55 maintains the MOSFET 44 in saturation by discharging the capacitor 60 when the bias on the zener diode 55 reverses at the beginning of each "ON" pulse. The period of the pulse train and the time constant of the RC network 56,60 are chosen such that the zener diode 55 discharges the capacitor 60 before a sufficient voltage signal is produced to cause the MOSFET 44 to move into the active region.

Other aspects, objects and advantages of the present invention can be obtained from a study of the drawings, the disclosure and the appended claims.

We claim:

1. An apparatus for dampening current in a coil, said coil having first and second terminals and being connectable to a flyback circuit an a source circuit, said source circuit having a current source and a coil switching element having "ON" and "OFF" states, and said coil being adapted to pass current, comprising:
   means for producing a voltage signal as a function of the magnitude of the current passing through said flyback circuit; and
   means for receiving said voltage signal and varying the resistance of said flyback circuit as a function of the received voltage signal.

2. An apparatus for dampening current in a coil, said coil having first and second terminals and being connected to a flyback circuit and a source circuit, said source circuit having a current source and a coil switching element having "ON" and "OFF" states, and said coil being adapted to pass current, comprising;
   means for producing a voltage signal as a function of the magnitude of the current passing through said flyback circuit; and
   means for receiving said voltage signal and varying the resistance of said flyback circuit as a function of the received voltage signal, said flyback circuit includes said receiving means and a diode having an anode and a cathode, said receiving means includes a field effect transistor having a drain and a source, one of said drain and source being connected to one of said anode and cathode, and said flyback circuit being connected in parallel with the coil.

3. An apparatus, as set forth in claim 2, wherein said cathode of the diode is connected to said first terminal of the coil, said anode of the diode is connected to said transistor drain, and said transistor source is connected to the second terminal of the coil.

4. An apparatus, as set forth in claim 2, wherein said field effect transistor has a gate, and said producing means includes a capacitor connected to and between said transistor gate and the first terminal of said coil.

5. An apparatus, as set forth in claim 2, wherein said field effect transistor has a saturated state, and including a means for maintaining said field effect transistor in the saturated state in response to said coil switching element being in the "ON" state.

6. An apparatus, as set forth in claim 5, wherein said field effect transistor has a gate, and said maintaining means includes a zener diode connected in parallel with said transistor gate and said transistor source.

7. An apparatus, as set forth in claim 5, wherein said field effect transistor has a gate, and said producing means includes a capacitor connected to and between said transistor gate and the first terminal of said coil.

8. An electric motor system having a coil, a source circuit, a flyback circuit, a traction motor, and a contactor, said coil being connected to the source circuit and to the flyback circuit, said source circuit having a current source and a coil switching element having "ON" and "OFF" states, said contactor having a member being movable between open and closed positions at which the contactor blocks and passes current, respectively, in response to current flowing through said coil, and said contactor being connected to and between said current source and said traction motor, comprising;
   means for producing a voltage signal as a function of the magnitude of the current passing through said flyback circuit; and
   means for receiving said voltage signal and varying the resistance of said flyback circuit as a function of the received voltage signal.

9. An electric motor system having a coil, a source circuit, a flyback circuit, a traction motor, and a contactor, said coil being connected to the source circuit and to the flyback circuit, said source circuit having a current source and a coil switching element having "ON" and "OFF" states, said contactor having a member being movable between open and closed positions at which the contactor blocks and passes current, respectively, in response to current flowing through said coil, and said contactor being connected to and between said current source and said traction motor, comprising;
   means for producing a voltage signal as a function of the magnitude of the current passing through said flyback circuit; and
   means for receiving said voltage signal and varying the resistance of said flyback circuit as a function of the received voltage signal, said flyback circuit includes a diode having an anode and a cathode, and said receiving means includes a field effect transistor having a drain and a source, one of said transistor drain and transistor source being connected to one of said anode and cathode.

10. A motor system, as set forth in claim 9, wherein said cathode of the diode is connected to said first terminal of the coil, said anode of the diode is connected to said transistor drain, and said transistor source is connected to the second terminal of the coil.

11. A motor system, as set forth in claim 9, wherein said field effect transistor has a gate, and said producing means includes a capacitor connected to and between said transistor gate and the first terminal of said coil.

12. A motor system, as set forth in claim 9, including a means for maintaining said field effect transistor in the saturated state in response to said coil switching element being in the "ON" state.

13. A motor system, as set forth in claim 12, wherein said field effect transistor has a gate and said maintaining means includes a zener diode connected in parallel with said transistor gate and source.

14. A motor system, as set forth in claim 12, wherein said field effect transistor has a gate, and said producing means includes a capacitor connected to and between said transistor gate and the first terminal of said coil.

15. A work vehicle having a traction motor, a current source connected to said traction motor, and a contactor connected to and between the current source and traction motor, comprising;

a coil having first and second terminals connected to said current source;

a flyback circuit having a diode and a field effect transistor having a drain, a source, and a gate, said diode being connected in series with said field effect transistor, said flyback circuit being connected in parallel with said coil;

a coil switching element being connected to and between said coil and said current source and being adapted to controllably pass current from the current source to said coil;

a zener diode being connected to and between said transistor gate and said transistor source;

a resistor being connected in parallel with said zener diode; and a capacitor being connected to and between said transistor gate and said first terminal of the coil.

* * * * *